United States Patent [19]

Carré et al.

[11] Patent Number: 4,651,528

[45] Date of Patent: Mar. 24, 1987

[54] HYDRAULIC AMPLIFIER FOR BRAKING SYSTEM

[75] Inventors: Jean-Jacques Carré, Le Raincy; Gilbert Kervagoret, Argenteuil; Roland Levrai, Stains, all of France

[73] Assignee: Societe Anonyme D.B.A., Paris, France

[21] Appl. No.: 663,261

[22] Filed: Oct. 22, 1984

[30] Foreign Application Priority Data

Nov. 10, 1983 [FR] France ............... 83 17892

[51] Int. Cl.⁴ .................. B60T 13/20; F15B 7/00
[52] U.S. Cl. .................. 60/556; 60/560; 60/563; 60/565
[58] Field of Search ............ 60/555, 556, 560, 563, 60/565

[56] References Cited

U.S. PATENT DOCUMENTS 3,514,163  5/1970  MacDuff ................. 60/555 X
3,798,905  3/1974  Tennis .................. 60/555
4,312,182  1/1982  Filderman .............. 60/556 X

FOREIGN PATENT DOCUMENTS 2066957  8/1971  France .
2227159 11/1974  France .
2440854  6/1980  France .
 797035  6/1958  United Kingdom .......... 60/555

Primary Examiner—Robert E. Garrett
Assistant Examiner—Mark A. Williamson
Attorney, Agent, or Firm—Ken C. Decker; Ronald D. Welch

[57] ABSTRACT

The invention concerns a hydraulic amplifier for a braking system incorporating a body (10, 110), a first component (18, 124) capable of being displaced in the body (10, 110) under the effect of the operation of a brake pedal, between a first position causing a first chamber (16), joined to a braking circuit, to communicate with a low pressure reservoir (44, 138), and isolating this chamber (16) from a high pressure source (32, 130), and a second position isolating the chamber (16) from the low pressure reservoir (44, 138) and causing it to communicate with the high pressure source (32, 130), characterized in that it incorporates a second chamber (12, 112) formed in the body (10, 110), a circuit (42) causing this second chamber (12, 112) to communicate with the low pressure reservoir (44, 138), and a valve means (34, 116) responsive to the pressure of the high pressure source (32, 130) normally closing this circuit under the effect of the pressure of the high pressure source (32, 130).

5 Claims, 4 Drawing Figures

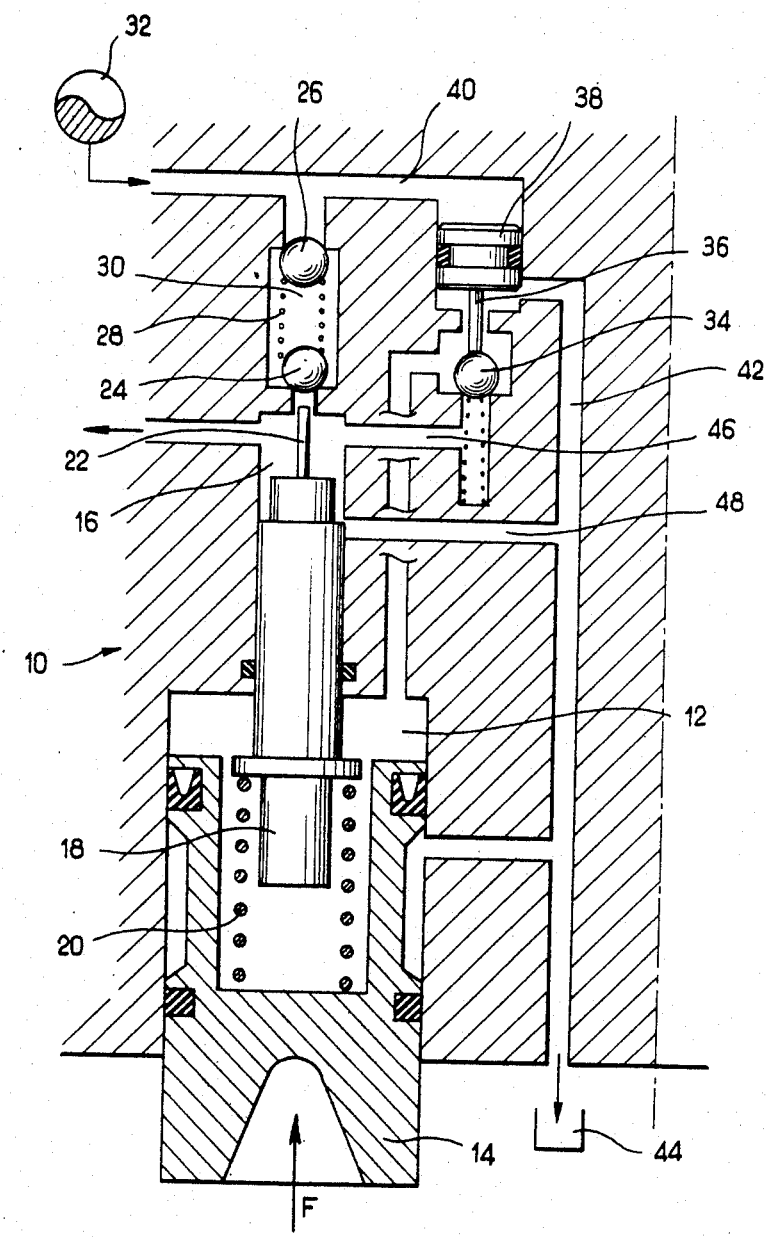
FIG_1

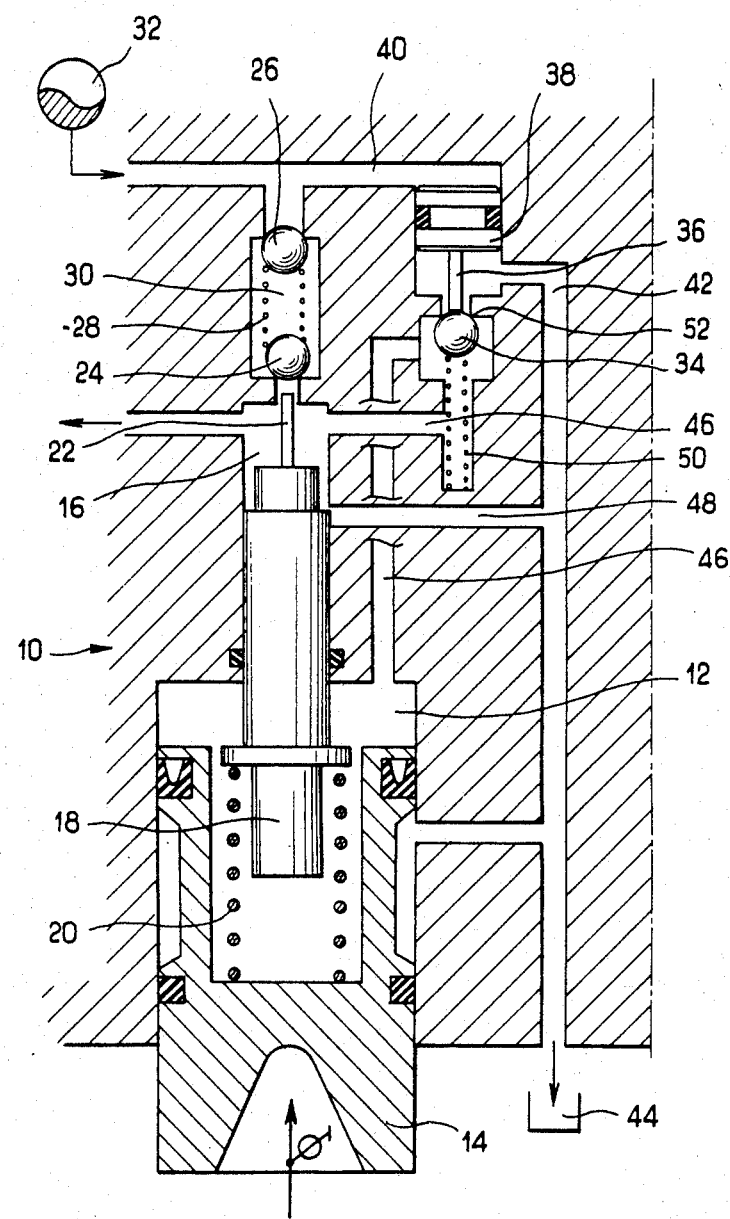
FIG_2

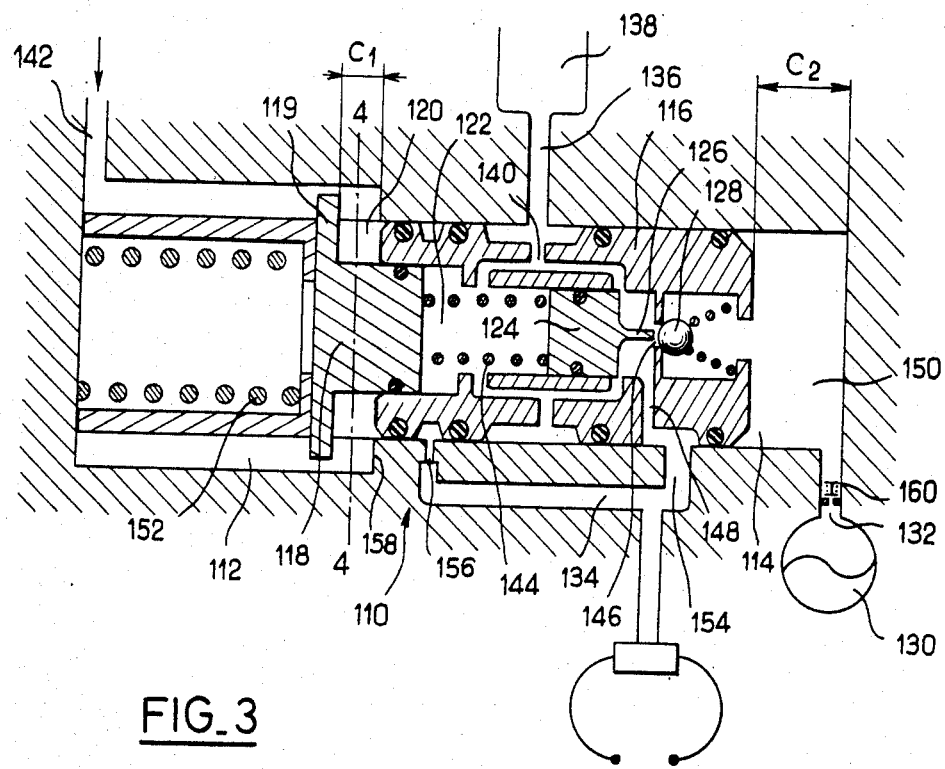
FIG_3
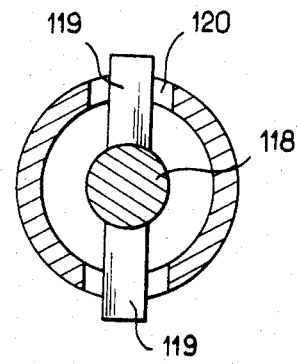
FIG_4

HYDRAULIC AMPLIFIER FOR BRAKING SYSTEM

The present invention concerns hydraulic amplifiers for braking systems.

A hydraulic amplifier for a braking system known as "full power" is known from French Patent Application 2,221,316, incorporating a casing in which a working chamber is formed. A piston actuator is slideably mounted in a portion of the chamber. Another portion of the chamber is provided with an assembly of control valves capable of being operated by a plunger joined to the brake pedal. A high pressure valve of the ball type is linked to the plunger, which also forms a distributor slide valve. During braking, operation of the plunger operates the slide valve and opens the fluid path to a set of brakes. In the case of failure of the high pressure circuit, the system described above becomes inoperative for the associated braking circuit, the braking of the vehicle being provided by another braking circuit.

The aim of the invention is therefore to propose a hydraulic amplifier for a braking system of the "full power" type, capable of functioning as a normal master cylinder in the case of failure of the high pressure circuit, which is of simple construction, of low manufacturing cost and increased reliability. To achieve this the invention provides a hydraulic amplifier for a braking system incorporating a body, a first component capable of being displaced in the body under the effect of the operation of a brake pedal, between a first position causing a first chamber, joined to a braking circuit, to communicate with a low pressure reservoir, and isolating this chamber from a high pressure source, and a second position isolating the chamber from the low pressure reservoir and causing it to communicate with the high pressure source, characterized in that it incorporates a second chamber formed in the body, a circuit causing this second chamber to communicate with the low pressure reservoir, and a valve means responsive to the pressure of the high pressure source normally closing this circuit under the effect of the pressure of the high pressure source.

Other characteristics and advantages of the present invention will emerge from the following description of two embodiments, given by way of illustration but not limiting in any way, with reference to the accompanying drawings, in which:

FIG. 1 is a longitudinal section of a hydraulic amplifier for a braking circuit;

FIG. 2 is a longitudinal section of the hydraulic amplifier shown in FIG. 1 in the configuration corresponding to a breakdown of the high pressure circuit;

FIG. 3 is a longitudinal section of a hydraulic amplifier according to a second embodiment;

FIG. 4 is a lateral section on the line "4—4" shown in FIG. 3.

FIG. 1 shows one half of a twin hydraulic amplifier, the other half (not shown) being identical. The amplifier incorporates a body 10 in which is formed a pressure chamber 12. A piston 14 is slideably mounted in the chamber 12. The body 10 is also provided with a bore 16 in which a plunger 18 is slideably mounted. The piston 14 is capable of being operated by the brake pedal (not shown) which acts in the direction of the arrow F. The force of the brake pedal is transmitted from the piston 14 to the plunger 18 by a spring 20 whose purpose is to provide a certain pedal travel.

The plunger 18 is provided, at its outer end, with a rod 22 intended to open a ball valve 24 which is joined to a second ball valve 26 by a spring 28. The two valves 24 and 26 close a passage 30 between a high pressure source of hydraulic fluid 32 and a set of brakes of the vehicle (not shown). The amplifier also incorporates a third ball valve 34 which is linked, by a rod 36, to a piston 38. The piston 38 is displaced into the position shown in FIG. 1 under the effect of the pressure of the hydraulic fluid from the source 32, which passes through a passage 40 with which the passage 30 communicates. In the normal operating position shown, the valve 34 opens a passage 42 between the pressure chamber 12 and a low-pressure reservoir 44 (not shown), and closes a passage 46 between the chamber 12 and the brakes.

During operation of the illustrated amplifier, a force applied by the brake pedal to the piston 14 is transmitted to the plunger 18 by the spring 20. On being displaced, the plunger 18 closes a passage 48 which leads to the passage 42, and the rod 22 opens the ball valve 24 against the effect of the spring 28. The pressure of the hydraulic fluid opens the valve 26 and the fluid passes through the passage 30 to the brakes.

FIG. 2 shows the amplifier of FIG. 1 in the case of breakdown of the high pressure source 32. The reduction in pressure of the fluid in the passage 40 allows the piston 38 to be displaced, under the effect of a spring 50, into the position shown. In this position the ball 34 bears against the seat 52 and thus closes the passage between the chamber 12 and the reservoir 44. This displacement of the ball 34 also opens the conduit 46 between the chamber 12 and the brakes. The piston 14 thus becomes the piston of a conventional master cylinder. The displacement of the piston 14 under the effect of the brake pedal also displaces the plunger 18 so that the latter closes the passage 48. Even if the rod 22 opens the ball valve 24, the passage 30 remains closed by the valve 26. The hydraulic pressure generated in the chamber 12 by the piston 14 passes through the passage 46 to the brakes.

FIG. 3 shows a second embodiment of a hydraulic amplifier which incorporates a body 110 in which a pressure chamber 112 is formed. The body 110 is provided with a bore 114 in which a primary piston 116 is slideably mounted. A secondary piston, which incorporates two arms 119, is mounted in an opening 120 in the primary piston 116, and is partially housed so as to slide in a secondary bore 122 inside the primary piston (see FIG. 4). Also slideably mounted in the secondary bore 122 is a plunger or distributor 124 which is provided with a rod 126 intended to open a ball valve 128 mounted in the piston 116 and urged towards the closed position by a spring. A high pressure source 130 of hydraulic fluid is joined to the bore 114 by a passage 132. A forked passage 134 leads from the bore 114 to the brakes of the vehicle, and a third passage 136 leads from the bore 114 to a low pressure reservoir. The primary piston 116 is provided with a forked passage 140 which joins two axially separated zones of the secondary bore 122 and which is in communication with the passage 136. The amplifier shown is connected to a conventional master cylinder (not shown) through a passage 142.

During operation of the illustrated amplifier, the fluid under pressure from the master cylinder passes through the passage 142 and exerts a force on the secondary piston 118 which is transmitted to the distributor 124 by way of a spring 144. The distributor 124 is displaced to the right, referring to the figure, and the rod 126 bears against the ball 128 and displaces it from its seat 146. When it is displaced, the distributor 124 closes the passage 140 and thus the return passage 136 towards the reservoir. Opening the ball valve 128 distributes the pressure from the source 130 via an orifice 148 and the passage 134 towards the brakes. The increase of brake pressure on the distributor 124 is reflected, by the spring 144 and the piston 118, on the pressure in the master cylinder. On releasing the force on the brake pedal, the pressure in the master cylinder decreases, the distributor 124 retracts and reopens the passage 140 which allows the fluid to drain to the reservoir 138, and allows the release of the brakes. The displacement of the piston 118 against the spring 144 causes fluid to be used and creates an artificial travel C of the pedal.

In the case of failure of the high pressure source, the pressure falls in the region 150 of the bore 114 and the primary piston 116 is displaced to the right, referring to the figure, under the effect of a spring 152. On being displaced, the piston 116 closes an orifice 154 of the passage 134 and opens the other orifice 156 of the passage 134. The two arms 119 of the secondary piston 118 come into abutment against a shoulder 158 of the body 110. From this moment the brakes are supplied directly by the master cylinder in the conventional manner, the fluid passing through the passage 142, the chamber 112, the orifice 156 and the passage 134.

To provide assistance, during hydrostatic operation, the secondary piston 118 has a larger diameter than that of the distributor 124. A non-return valve 160 may be advantageously provided in the passage supplying fluid under pressure 132.

We claim:

1. A hydraulic amplifier for a braking system incorporating a body (10), a first component (18) capable of being displaced in a body (10) under the effect of the operation of a brake pedal between a first position wherein a first chamber (16) joined to a braking circuit communicates with a low pressure reservoir (44) and isolates chamber (16) from a high pressure source (32) and a second position isolating the chamber (16) from the low pressure reservoir (44) and causing the first chamber (16) to communicate with the high pressure source (32), characterized in that the amplifier incorporates a second chamber (12) formed in the body (10), a first circuit (42) communicating the second chamber (12) with the low pressure reservoir (44), and valve means (34) responsive to the pressure of the high pressure source (32) normally opening the first conduit under the effect of the pressure of the high pressure source (32) and operable to a second position in response to loss of said high pressure to close communication between said second chamber and said reservoir and establish communication thereof with said braking circuit, said valve means including a valve element (34) reciprocably movable in a valve chamber between a pair of valve seats, said valve element closing said first circuit when said valve element engages one of said pair of valve seats and closing communication between said second chamber and said reservoir when said valve element engages the other of said pair of valve seats, a piston fluidly connected to said high pressure source and operatively connected to said valve element to move said valve element into engagement with said other of said valve seats in response to fluid pressure from said pressure source and a spring operatively engaging said valve element to move said valve element into engagement with said one valve seat in the absence of pressure from said pressure source.

2. A hydraulic amplifier according to claim 1, characterized in that said first component (18) is linked by a spring to a second component (14), capable of being operated by the brake pedal.

3. A hydraulic amplifier according to claim 2, characterized in that said second component (14) slides in said second chamber (12) and forms the piston of a master cylinder when said valve means is in said second position.

4. A hydraulic amplifier according to claim 3 characterized in that said body (10) includes a fluid passage (30) extending between said high pressure source (32) and said brake circuit, a first normally closed ball valve in said passage (30) and being engaged by and movable between said normally closed position and an open position in response to movement of said first component (18) to apply pressure from said high pressure source (32) to said braking circuit and a second normally closed ball valve disposed in said passage (30) and operable to an open position by the pressure from the high pressure source (32).

5. A hydraulic amplifier according to claim 4 wherein said passage (30) includes axially spaced valve seats, a pair of spherical valve elements (24, 26) and a spring operatively engaging said balls (24, 26) to maintain same in their normally closed positions.

* * * * *